United States Patent

[11] 3,601,620

[72] Inventor Gordon E. Gee
Homewood, Ill.
[21] Appl. No. 842,846
[22] Filed July 18, 1969
[45] Patented Aug. 24, 1971
[73] Assignee Electro Proudcts Laboratories, Inc.

[54] POWER SUPPLY
9 Claims, 2 Drawing Figs.

[52] U.S. Cl. .......... 307/116, 307/41, 317/146
[51] Int. Cl. .......... H01h 35/00
[50] Field of Search .......... 317/146; 307/116, 38, 39, 41

[56] References Cited

UNITED STATES PATENTS

| | | | |
|---|---|---|---|
| 3,144,591 | 8/1964 | Levinson | 317/142 |
| 3,483,437 | 12/1969 | Coyne | 317/146 |
| 3,392,349 | 7/1968 | Bartley | 317/146 |

*Primary Examiner*—Robert K. Schaefer
*Assistant Examiner*—William J. Smith
*Attorney*—Hofgren, Wegner, Allen, Stellman and McCord

ABSTRACT: An AC to DC power supply for a sensing system in which an oscillator responds to a condition being sensed and a detector connected with the output of the oscillator provides a signal utilized in a control or indicator. The detector is connected with the power supply through a transistor switch which responds to the source of voltage and has a time delay to prevent energization of the detector unless the oscillator is operating.

PATENTED AUG 24 1971 3,601,620

INVENTOR

Gordon E. Gee

BY Hofgren, Wegner, Allen, Stellman & McCord

ATTORNEYS

POWER SUPPLY

Metal proximity sensing devices are used in many types of machine and process control where sensing devices respond to the presence or absence of metal as a machine part or a work piece. A popular sensing device has an oscillator, the oscillatory condition of which is determined by the proximity of metal to a sensing coil. A detector connected with the output of the oscillator provides a signal indicating the oscillator condition. This signal in turn may be used in control of the process or as an indication to an operator.

A false indication sometimes occurs when the system is turned on or off. The false indication may result from transient conditions in the oscillator, the detector or the power supply (generally an AC to DC rectifier supply).

A principal feature of the invention is the provision of a power supply circuit including a switch through which the detector is powered and which prevents application of power to the detector unless power is also applied to the oscillator.

More specifically, one feature of the invention is that the switch is normally open and is provided with switch closing means responsive to the output voltage of the power source.

Another feature is that the switch closing means includes a time delay means.

A further feature is that the normally open switch includes a transistor switch with emitter-collector circuit normally nonconductive and means, including a voltage sensitive device (as a Zener diode), for applying a potential to the base of the transistor to render it conductive.

And another feature is that a capacitor is connected across the Zener diode to introduce a time delay in opening of the switch.

Yet a further feature is that the time delay capacitor serves to maintain energization of the oscillator after the detector is deenergized, when the system is turned off.

Further features and advantages of the invention will readily be apparent from the following specification and from the drawings, in which.

Proximity sensing systems are used in many ways to monitor or control various repetitive operations and to shut the operation down or give a warning in the case of a malfunction. No attempt is made here to illustrate any particular environment for the invention.

Figure 1:
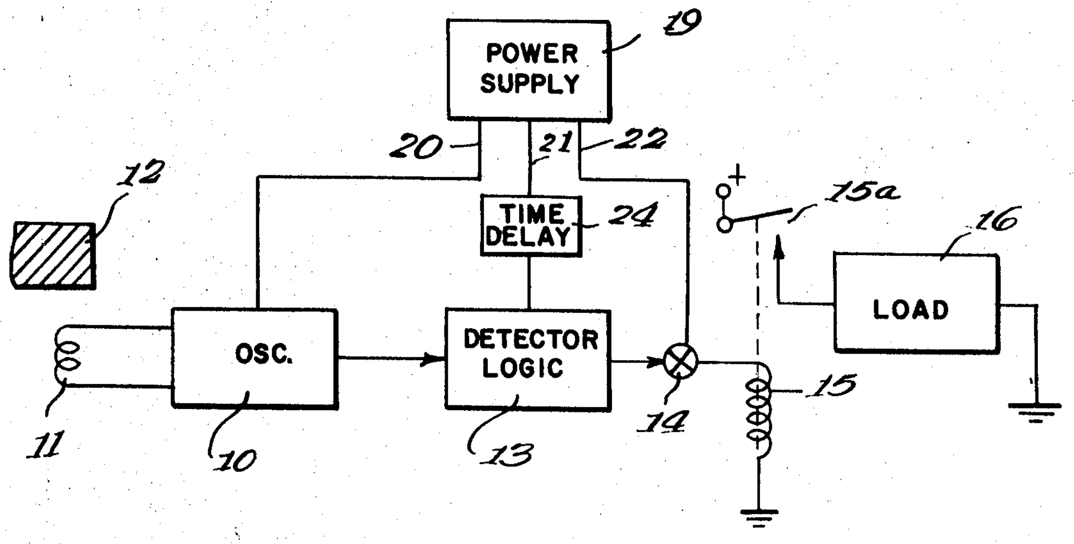
FIG. 1 is a block diagram of a sensing system incorporating the invention.

In FIG. 1 a representative sensing system is illustrated in block form. An oscillator 10 has a sensing coil 11 and the level of output from the oscillator is determined by the proximity (or lack thereof) of a mass of metal 12 to the coil 11. A detector logic circuit 13 is connected with the output of the oscillator and in turn controls a switch 14 through which an output relay 15 is energized. The switch 14 may, for example, be a solid-state switch or a reed relay or the like. Relay 15 in turn operates contact 15*a* to control a load 16.

Power supply 19 has outputs at 20, 21 and 22, for operating the oscillator 10, detector and logic circuit 13 and relay 15, respectively. Connected between power supply 19 and detector and logic circuit 13 is a voltage sensitive time delay circuit 24 which delays application of operating power to the detector and logic circuit when the system is turned on and insures that the detector is energized only when an adequate operating voltage for the oscillator is present.

In FIG. 1 the output circuitry including switch 14 and relay 15 are illustrated separately from detector and logic network 13, for clarity in description of the operation of the system. Insofar as the invention is concerned, these functions may be combined, the important factor being that actuation of load 16, whether by way of energization or deenergization of a specific circuit, is dependent on the level of voltage from power supply 19 and includes a time delay to permit stabilization of oscillator 10 when the system is turned on and to turn the detector off before the oscillator when the system is deenergized.

Figure 2:
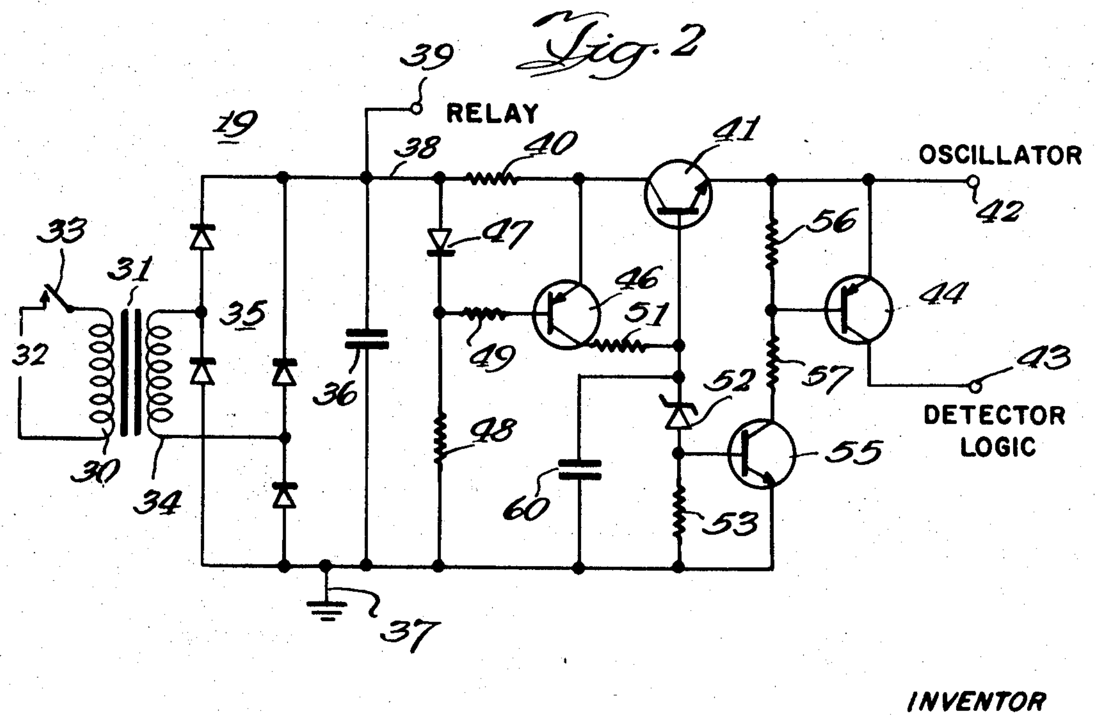
FIG. 2 is a schematic diagram of a power supply illustrating the invention.

The embodiment of the invention illustrated in FIG. 2 utilizes an AC to DC converter or rectifier power supply 19. The primary winding 30 of transformer 31 is connected with a suitable source of power, as 60 Hz., 110 volts, through leads 32 and power switch 33. The secondary winding 34 of the transformer is connected with a bridge rectifier circuit 35, the output of which is smoothed by filter capacitor 36. One terminal of the power supply is connected with a reference potential or ground 37 and the other terminal 38 provides operating voltages for the various loads in the system. The output from the power supply for relay 15 is derived directly across capacitor 36 through terminal 39.

Connected in series with the output from the power supply is a current sensing resistor 40 and a series regulator transistor 41. The oscillator power circuit is connected with terminal 42. The detector and logic network power circuits are connected with terminal 43 and through transistor switch 44 with the output of the power supply at terminal 42.

When the power supply is in operation, transistor 46 conducts. The base potential for transistor 46 is provided by a voltage divider comprised of diode 47 and resistor 48 connected in series across the output of the power supply. The base of the transistor is connected with the junction between these two elements, through a current limiting resistor 49. The base to emitter voltage of the transistor 46 is determined by the current flow through resistor 40. The collector of transistor 46 is connected through resistor 51 with a voltage regulating device, Zener diode 52, and returned through resistor 53 to ground. The base of series regulating transistor 41 is connected to the junction between resistor 51 and Zener diode 52. The voltage across the combination of Zener diode 52 and resistor 53 is applied to the base of the current regulating transistor 41, varying its impedance in accordance with the output voltage from the rectifier 35.

Transistor 55 has its base-emitter circuit connnected across resistor 53 and, when Zener diode 52 conducts, transistor 55 is rendered conductive, causing current to flow through its emitter-collector circuit and resistors 56, 57. The base to emitter circuit of transistor 44 is connected across resistor 56 so that transistor 44 conducts when current flows through the resistor. This in turn completes the emitter-collector circuit of transistor 44 applying power to terminal 43 for the detector and logic circuit. Thus, transistors 55 and 44 form a two-stage switch responsive to the level of output voltage of the rectifier 35 as determined by Zener diode 52.

When the power supply is first energized, the application of power to the detector and logic circuit 13 is delayed. A time delay capacitor 60 is connected in shunt with the series combination of Zener diode 52 and resistor 53. This capacitor is charged when the circuit is first energized through transistor 46 and resistor 51, delaying the application of a firing potential to Zener diode 52 for a suitable time period following energization of the power supply. In a representative system, resistor 51 is 1500 ohms and capacitor 60, 500 $\mu$f. This provides a time delay of slightly less than 1 second in the application of operating potential to the detector and logic circuit, following energization of the oscillator. The delay is sufficient to allow the oscillator operation to stabilize and to eliminate transient conditions.

When the system is turned off, Zener 52 ceases conduction almost instantaneously. However, the charge on capacitor 60 maintains conduction of series regulator transistor 41, keeping the oscillator in operation until the detector and logic circuit 13 is turned off.

In the even of a short circuit in the oscillator or detector circuitry, the increase in current through series resistor 40 causes a voltage drop across the resistor which is greater than that across diode 47, and transistor 46 is turned off. This in turn causes series transistor 41 to cease conduction, preventing damage to the power supply.

I claim:

1. In a sensing apparatus having an oscillator, the oscillatory condition of which is a function of the condition being sensed, a detector circuit responsive to the oscillatory condition of said oscillator, an output circuit connected with said detector, and a DC power supply for the oscillator and detector circuits, the improvement comprising:

- a source of DC power having an output;
- a connection from said output to said oscillator;
- a normally open switch means connected between said power source output and said detector circuit; and
- means responsive to the application of power by said power supply to said oscillator for thereafter closing said switch means after a predetermined time period has elapsed whereby said detector circuit cannot be energized until the oscillator has been permitted to stabilize so that the oscillatory condition of the oscillator cannot be detected during start-up of the same.

2. The power supply of claim 1 in which said switch closing means is responsive to the voltage of said source.

3. The power supply of claim 1 in which said normally open switch means includes a voltage sensitive device.

4. The power supply of claim 3 in which said voltage sensitive device is a Zener diode.

5. The power supply of claim 1 in which said switch means includes a two-stage transistor switch.

6. The power supply of claim 1 in which said normally open switch means includes a transistor switch with an emitter-collector circuit connected across said source; and

- means for applying a potential to the base of said transistor to render the emitter-collector circuit conductive, including a resistance-capacitance charging circuit.

7. The power supply of claim 6 including a Zener diode connected across the capacitive element of said charging circuit and to the base of said transistor.

8. The power supply of claim 1 wherein said switch closing means is further operative to immediately open said switch in response to the deenergization of said power supply; and further including means for temporarily maintaining said oscillator in an operating condition upon the deenergization of said power supply whereby transient conditions during deenergization of the oscillator cannot cause an erroneous detection by said detector circuit.

9. The power supply of claim 1 wherein said switch means comprises at least one transistor and said switch closing means comprises a serial combination of a Zener diode and a resistor connected across the source and having their common junction connected to the base of the transistor, and a capacitor connected in parallel with said serial combination, whereby said transistor will not be turned on after the application of power to said oscillator until said capacitor is charged to a predetermined level, the charge on said capacitor further being operative to temporarily maintain said oscillator in an operative condition upon deenergization of said power supply.